United States Patent Office 3,493,048
Patented Feb. 3, 1970

3,493,048
COSURFACTANT INFLUENCING THE THERMO-STABILITY OF MICELLAR DISPERSIONS
Stanley C. Jones, Littleton, Colo., assignor to Marathon Oil Company, Findlay, Ohio, a corporation of Ohio
No Drawing. Filed July 22, 1968, Ser. No. 746,258
Int. Cl. E21b 47/06, 43/22
U.S. Cl. 166—252
15 Claims

ABSTRACT OF THE DISCLOSURE

Thermostability of micellar dispersion containing hydrocarbon, aqueous medium, surfactant and cosurfactant is shifted to higher temperature ranges by increasing the concentration of cosurfactant within the micellar dispersion. The micellar dispersion can optionally contain electrolyte. Such micellar dispersions are useful in recovering crude oil in a secondary or tertiary oil recovery process, especially where the temperature is in excess of ambient temperature.

BACKGROUND OF THE INVENTION

Micellar dispersions are useful as miscible-type displacement agents to recover crude oil from subterranean formations. Examples of processes using micellar dispersions are taught in United States Patent Nos. 3,254,714 to Gogarty et al; 3,275,075 to Gogarty et al.; 3,266,570 to Gogarty; and 3,297,084 to Gogarty et al.

The method of recovery is accomplished by injecting the micellar dispersion into an injection well in fluid communication via an oil-bearing subterranean formation with a producing well and displacing the micellar dispersion through the formation, crude oil is recovered through the producing well. Due to the depth and conditions of the reservoir, the reservoir temperature can vary over a wide range of temperatures, e.g. from below about ambient temperature to about 200° F. or more. It is generally accepted that the normal temperature gradient of the subsurface is about 1° F. per 60 feet.

Applicant has discovered that by increasing the concentration of cosurfactant in the micellar dispersion the thermostability of the dispersion can be shifted to higher temperature ranges. However, the micellar dispersion may be unstable at a lower temperature range with the increased concentration of cosurfactant. The term "thermostability" as used herein means thermodynamically stable, i.e. a system below or above the thermostability temperature range will exhibit two or more distinct layers or phases, indicating an unstable system or an emulsion.

DESCRIPTION OF THE INVENTION

The term "micellar dispersion" as used herein is meant to include micellar solutions, "micro-emulsions" [Schulman and Montagne, Anals of the New York Academy of Sciences, 92, pages 366–371 (1961)], "transparent" emulsions (Blair, Jr., et al., United States Patent No. 2,356,205) and micellar dispersion technology taught by C. G. Sumner, Clayton's, The Theory of Emulsions and Their Technical Treatment, 5th Edition, pp. 315–320 (1954). Micellar dispersions differ from emulsions in many ways, the strongest difference being that the former are thermodynamically stable and generally transparent whereas the latter are not.

The micellar dispersion is composed of hydrocarbon, aqueous medium, surfactant sufficient to impart micellar characteristics to the dispersion and cosurfactant. Optionally, electrolyte can be incorporated into the dispersion. Examples of volume amounts include from about 4% to about 60% or more of hydrocarbon, from about 20% to about 90% aqueous medium, at least about 4% surfactant, from about 0.01 to about 20% of cosurfactant (also identified as semipolar organic compound and cosolubilizer) and up to about 5% or more by weight (based on the aqueous medium) of electrolyte. In addition, the dispersion can contain other additives such as corrosion and scale inhibitors, bactericides, etc.

The micellar dispersion can be oil-external or water-external.

Examples of hydrocarbon include crude oil (both sweet and sour) and partially refined fractions thereof, e.g., side cuts from crude columns, crude column overheads, gas oils, kerosene, heavy naphthas, naphthas, straight-run gasoline, and liquefied petroleum gases. Pure hydrocarbons are also useful, e.g. paraffin compounds including propane, pentane, heptane, decane, dodecane, etc.; cycloparaffins compounds including cyclohexane, etc.; aryl compounds including benzene, naphthalene, anthracene, etc.; alkylated products thereof including toluene, alkyl phenols, etc. Based on economics, the preferred hydrocarbon is one locally available. The unsulfonted hydrocarbon (e.g. heavy vacuum gas oils) in petroleum sulfonates is also useful.

The aqueous medium can be soft, brackish, or a brine. Preferably, the water is soft but it can contain small amounts of salts which are compatible with the ions in the subterranean formations being flooded.

Surfactants useful with the dispersions include nonionic, cationic, and anionic surfactants. Examples of such surfactants include sodium glyceryl monolaurate sulfate, dihexyl sodium succinate, hexadecylnaphthalene sulfonate, diethyleneglycol sulfate, glycerol disulfoacetate monomyristate, p-toluidene sulfate laurate, p-chloroaniline sulfate laurate, sodium sulfato oleylethylanilide, triethanolamine myristate, N-methyltuarine oleamide, pentaerythritol monostearate, polyglycerol monolaurate, triethanolamine oleate, morpholine stearate, hexadecyl trimethylammonium chloride, ditetradecyl dimethyl ammonium chloride, n-dodecyl-diethyleneglycol sulfate, monobutylphenyl phenol sodium sulfate, and triethanolamine laurate or triethanolamine oleate. Other useful surfactants include Duponol WAQE (a 30% active sodium lauryl sulfate marketed by DuPont Chemical Corporation, Wilmington, Delaware), Energetic W-100 (a polyoxyethylene alkyl phenol marketed by Armour Chemical Company, Chicago, Illinois), Triton X-100 (an alkylphenoxy polyethoxy ethanol marketed by Rohm & Hass, Philadelphia, Pennsylvania) and Arquad 12–50 (a 50% active dodecyl trimethyl ammonium chloride marketed by Armour Chemical Company, Chicago, Illinois), and like materials.

An especially useful surfactant is petroleum sulfonate, also known as alkyl aryl naphthenic sulfonate. Such can be obtained by sulfonating at least a portion of a sulfonatable hydrocarbon (e.g. gas oils) and then neutralizing the mixture, e.g. with $NH_4OH$, $NaOH$, $NH_3$, etc. The sulfonate can contain, after extraction, e.g. from about 50% to about 100% active sulfonate. Examples of preferred surfactants are the sodium and ammonium petroleum sulfonates having an average molecular weight of from about 360 to about 520, and more preferably from about 420 to about 470. The sulfonate can be a mixture of low and high molecular weight sulfonates. Surfactants of like character are also useful.

The cosurfactant useful with the invention should have limited water solubility, e.g. from about 1% to about 20% at ambient temperature. Examples of cosurfactants include alcohols, amino compounds, esters, aldehydes and ketones containing from 3 to about 20 or more carbon atoms and more preferably from about 5 to about 16 carbon atoms. The cosurfactant is preferably an alcohol, e.g. n- and isobutanol, the amyl alcohols such as n-amyl alcohol, 1- and 2-hexanol, 1- and 2-octanol, decyl alcohols, alkaryl alcohols such as p-nonyl phenol and alcoholic liquors such as fusel oil. Particularly useful alcohols include the primary butanols, primary pentanols and secondary hexanols. Concentrations of from about 0.01% to more than about 20 volume percent are useful in the micellar dispersion and more preferably from about 0.01 to about 5%. Mixtures of two or more cosurfactants are useful in the micellar dispersions.

Electrolytes useful in the dispersion include inorganic bases, inorganic acids, inorganic salts, organic bases, organic acids, and organic salts. Examples of useful electrolytes are found in U.S. Patent Nos. 3,297,084 and 3,330,343. Preferably, the electrolytes are inorganic acids, inorganic bases, and inorganic salts. Examples of preferable electrolytes includes sodium sulfate, sodium chloride, sodium hydroxide, hydrochloric acid, sulfuric acid, and sodium nitrate.

As mentioned previously, the thermostability of the micellar dispersion is shifted to higher temperatures by increasing the concentration of cosurfactant in the dispersion. Reservoir temperatures exceeding about ambient temperature, e.g. 80° F., will not adversely influence an oil recovery process using the micellar dispersions of this invention. That is, the micellar dispersion can be designed to have thermostability within the temperature range of the reservoir rock.

The lowest thermostability range of a dispersion of this invention would be one composed of a minimum amount of cosurfactant whereas the highest thermostability range of the micellar dispersion would be one composed of a maximum amount of cosurfactant. The maximum amount of cosurfactant that can be incorporated in a micellar dispersion will depend, inter alia, on the other components within the dispersion. That is, the amount and kind of surfactant, electrolyte, water, and hydrocarbon will influence the particular cosurfactant to obtain a micellar dispersion having desired characteristics—these characteristics include mobility, oil and water miscibility as well as thermostability.

Preferably, the micellar dispersion has a mobility less than the mobility of the combined formation fluids (crude oil plus formation water) within the reservoir formation. That is, the mobility of the micellar dispersion is preferably about equal to or less than that of the combined mobility of the crude oil and connate water within the reservoir.

The following examples are submitted to illustrate working embodiments of the invention. The invention is not to be restricted or limited by these examples. Rather, equivalents known in the art are intended to be included within the scope of the invention as taught within the specification and appended claims. Unless otherwise specified, percents are based on volume.

EXAMPLE 1

Three micellar dispersions having compositions as indicated in Table I are tested for their thermostability by subjecting them to a broad temperature range. The thermostability ranges of these dispersions are indicated in Table I. Temperatures below the "Lower Temperature Limit" and temperatures above the "Upper Temperature Limit" give two or more distinct layers or phases, indicating an emulsion. Temperatures between these limits give a thermodynamically stable micellar dispersion. Data are found in Table I.

TABLE I

| Component | Micellar dispersions | | |
|---|---|---|---|
| | No 1 | No. 2 | No. 3 |
| (a) Ammonium petroleum sulfonate (avg. MW=430, about 68% active) | 8.0 | 8.0 | 8.0 |
| (b) Hydrocarbon (crude column side cut, also identified as #2 diesel fuel) | 42.0 | 42.0 | 42.0 |
| (c) Water (contains about 400 p.p.m. of total dissolved solids) | 49.85 | 49.85 | 49.85 |
| (d) Cosurfactant (100% nonionic polyol) | 0.15 | 0.15 | 0.15 |
| (e) Cosurfactant: p-amyl alcohol cc./100 cc of dispersion | 0.20 | 0.70 | 1.20 |
| Thermostability range (° F.): | | | |
| (1) Lower temperature limit | <39 | 43 | 65 |
| (2) Upper temperature limit | 100 | 111 | 126 |

These data indicate a shift in the thermostability range to higher temperatures with an increase in the amount of p-amyl alcohol.

What is claimed is:

1. A process of recovering crude oil from oil-bearing substerranean formations having at least one production means and at least one injection means in fluid communication comprising: determining the temperature of the formation, injecting into the formation a miscellar dispersion comprised of hydrocarbon, surfactant, aqueous medium, and cosurfactant characterized in that the cosurfactant is present in sufficient amount to stabilize the mixture of micellar dispersion constituents at the formation temperature, displacing the miscellar dispersion through the formation and recovering crude oil through the production means.

2. The process of claim 1 wherein the mixture of micellar dispersion constituents contain electrolyte.

3. The process of claim 1 wherein the formation temperature is in excess of about 80° F.

4. The process of claim 1 wherein the formation temperature is in excess of about 150° F.

5. The process of claim 1 wherein the formation temperature is in excess of about 200° F.

6. The process of claim 1 wherein the surfactant is petroleum sulfonate.

7. The process of claim 1 wherein the cosurfactant is selected from the group consisting of alcohols, amino compounds, esters, aldehydes, and ketones containing from about 3 to about 20 carbon atoms.

8. The process of claim 1 wherein the cosurfactant is an alcohol characterized as having less than about 20% water solubility at ambient temperature.

9. A process of recovering crude oil from an oil-bearing subterranean formation having at least one production means and at least one injection means in fluid communication comprising: determining the temperature of the formation to be in excess of about 80° F., injecting into the formation a micellar dispersion comprised of hydrocarbon, petroleum sulfonate, aqueous medium, and alcohol having less than about 20% water solubility at ambient temperature, the micellar dispersion characterized in that the alcohol is present in sufficient amount to stabilize the mixture of micellar dispersion constituents at the formation temperature, displacing the micellar dispersion through the formation and recovering crude oil through the production means.

10. The process of claim 9 wherein the alcohol contains up to about 20 carbon atoms.

11. The process of claim 9 wherein the mixture of micellar dispersion constituents contains electrolyte.

12. A process of stabilizing a mixture of micellar dispersion constituents comprised of hydrocarbon, surfactant, aqueous medium, and cosurfactant at temperatures in excess of about 80° F., comprising increasing the amount of cosurfactant within the mixture to stabilize the mixture at the temperature in excess of about 80° F.

13. The process of claim 12 wherein the surfactant is a petroleum sulfonate.

14. The process of claim 12 wherein the cosurfactant is an alcohol characterized as having less than about 20% water solubility at ambient temperature.

15. The process of claim 12 wherein the temperature is in excess of about 150° F.

References Cited

UNITED STATES PATENTS

| | | | |
|---|---|---|---|
| 3,254,714 | 6/1966 | Gogarty et al. | 166—274 |
| 3,266,570 | 8/1966 | Gogarty | 166—273 |
| 3,275,075 | 9/1966 | Gogarty et al. | 166—274 |
| 3,279,537 | 10/1966 | Kirk et al. | 166—274 |
| 3,297,084 | 1/1967 | Gogarty et al. | 166—274 X |
| 3,330,343 | 7/1967 | Tosch et al. | 166—274 X |
| 3,330,344 | 7/1967 | Reisberg | 166—275 X |
| 3,348,611 | 10/1967 | Reisberg | 166—274 X |
| 3,373,809 | 3/1968 | Cooke | 166—274 X |

STEPHEN J. NOVOSAD, Primary Examiner

U.S. Cl. X.R.

166—275

PO-1050
(5/69)

UNITED STATES PATENT OFFICE
CERTIFICATE OF CORRECTION

Patent No. 3,493,048        Dated February 3, 1970

Inventor(s) Stanley C. Jones

It is certified that error appears in the above-identified patent and that said Letters Patent are hereby corrected as shown below:

| | |
|---|---|
| Column 1, line 56: | Delete "Anals" and insert --Annals--. |
| Column 2, line 25: | Delete "unsulfonted" and insert --unsulfonated--. |
| Column 2, line 50: | Delete "Hass" and insert --Haas--. |
| Column 4, line 19: | Delete "substerranean" and insert --subterranean--. |
| Column 4, line 23: | Delete "miscellar " and insert --micellar--. |
| Column 4, line 27: | Delete "miscellar" and insert --micellar--. |

SIGNED AND
SEALED
JUL 7 1970

(SEAL)
Attest:

Edward M. Fletcher, Jr.
Attesting Officer

WILLIAM E. SCHUYLER, JR.
Commissioner of Patents